US006968351B2

(12) United States Patent
Butterworth

(10) Patent No.: US 6,968,351 B2
(45) Date of Patent: Nov. 22, 2005

(54) FREE SPACE COLLECTION IN INFORMATION STORAGE SYSTEMS

(75) Inventor: Henry Esmond Butterworth, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 09/929,894

(22) Filed: Aug. 14, 2001

(65) Prior Publication Data

US 2002/0087822 A1 Jul. 4, 2002

(30) Foreign Application Priority Data

Aug. 19, 2000 (GB) .............................. 0020395

(51) Int. Cl.[7] .............................................. G06F 12/00
(52) U.S. Cl. ..................................... 707/206; 711/111
(58) Field of Search .................... 707/1–5, 7, 100–102, 707/200–206; 711/111–114, 206, 207

(56) References Cited

U.S. PATENT DOCUMENTS

| 5,551,003 | A | * | 8/1996 | Mattson et al. | 711/136 |
| 5,604,902 | A | * | 2/1997 | Burkes et al. | 707/206 |
| 5,734,861 | A | * | 3/1998 | Cohn et al. | 711/134 |
| 5,802,344 | A | | 9/1998 | Menon et al. | 395/492 |
| 5,933,840 | A | | 8/1999 | Menon et al. | 707/206 |
| 5,933,845 | A | | 8/1999 | Kopp et al. | 711/103 |
| 6,282,605 | B1 | * | 8/2001 | Moore | 711/103 |
| 6,738,863 | B2 | * | 5/2004 | Butterworth et al. | 711/114 |

OTHER PUBLICATIONS

"The Design and Implementation of a Log Structured File System" by M Rosenblum and J K Ousterhout, ACM Transactions on Computer Systems, vol. 10 No. 1, Feb. 1992, pp 26–52.

"A Case for Redundant Arrays of Inexpensive Disks (RAID)". Report No UCBICSD 87/391, Dec. 1987, Computer Sciences Division, University of California.

"A Performance Comparison of RAID 5 and Log Structured Arrays", Proceedings of the Fourth IEEE International Symposium on High Performance Distributed Computing, 1995, pp 167–178.

* cited by examiner

Primary Examiner—Greta Robinson
Assistant Examiner—Miranda Le
(74) Attorney, Agent, or Firm—Kunzler & Associates

(57) ABSTRACT

A method for performing free space collection in an information storage system and an information storage system (104) are described. The information storage system (104) is a log structured system having storage units (106) in which information segments (202, 204) are located. Free space collection is carried out in the storage units by using a fitness value to evaluate segments (204). The fitness value is determined as the product of the amount of free space in a segment (204) and the expected time the free space will last (310). Segments (204) are chosen for free space collection if they have the maximum fitness value (312). The segments (204) are sorted into groups by the amount of used data in each segment (204) and the fitness value is determined for one segment from each group.

21 Claims, 5 Drawing Sheets

FREE SPACE COLLECTION IN INFORMATION STORAGE SYSTEMS

FIELD OF THE INVENTION

This invention relates generally to information storage systems and, more particularly, to a method and system of free space or garbage collection of segments in log structured storage systems.

BACKGROUND OF THE INVENTION

Log structured storage systems have been developed as a form of disk storage management to improve disk access time. Log structured file systems use the assumption that files are cached in a main memory and that increasing memory sizes will make the caches more effective at responding to read requests. As a result, disk use is dominated by writes. A log structured file system writes all new information to disk in a sequential structure call a log. New information is stored at the end of the log rather than updated in place, to reduce disk seek activity. As information is updated, portions of data records at intermediate locations of the log become outdated. This approach increases write performance by eliminating almost all seeks. The sequential nature of the log also permits faster crash recovery.

Some file systems incorporate the use of logging as an auxiliary structure to speed up writes and crash recovery by using the log only for temporary storage; the permanent home for information is in a traditional random access storage structure on disk.

In a log structured file system, data is stored permanently in the log and there is no other structure on disk. The log contains indexing information so that files can be read back with efficiency. For a log structured file system to operate efficiently, it must ensure that there are always large extents of free space available for writing new data.

Log structured file systems are described in "The Design and Implementation of a Log structured File System" by M. Rosenblum and J. K. Ousterhout, ACM Transactions on Computer Systems, Vol. 10 No. 1, February 1992, pages 26–52.

Log structured disks (LSD) and log structured arrays (LSA) are disk architectures which use the same approach as the log structured file systems (LFS). The present invention applies equally to all forms of log structured storage systems including LSD, LSA and LSF systems. However, focus is directed to LSAs by means of example and explanation in the description of the background art and the description of the present invention.

A log structured array (LSA) has been developed based on the log structured file system approach but is executed in an outboard disk controller. Log structured arrays combine the log structured file system architecture and a disk array architecture such as the well-known RAID (redundant arrays of inexpensive disks) architecture with a parity technique to improve reliability and availability. RAID architecture is described in "A Case for Redundant Arrays of Inexpensive Disks (RAID)", Report No. UCBICSD 87/391, December 1987, Computer Sciences Division, University of California, Berkeley, Calif. "A Performance Comparison of RAID 5 and Log Structured Arrays", Proceedings of the Fourth IEEE International Symposium on High Performance Distributed Computing, 1995, pages 167–178 gives a comparison between LSA and RAID 5 architectures.

An LSA consists of a disk controller and an array of N+1 physical disks. In an LSA, data is stored on disks in compressed form. After a piece of data is updated, it may not compress as well as it did before it was updated, so it may not fit back into the space that had been allocated for it before the update. The implication is that there can no longer be fixed, static locations for all the data. An LSA controller manages information storage to write updated data into new disk locations rather than writing new data in place. Therefore, the LSA must keep a directory which it uses to locate data items in the array.

As an illustration of the N+1 physical disks of the LSA array, an LSA may consist of a group of disk drive DASDS, each of which includes multiple disk platters stacked into a column. Each disk is divided into large consecutive areas called segment-columns. A segment-column is typically as large as a physical cylinder on a physical disk. Corresponding segment-columns from the N+1 disks constitute a segment. The array has as many segments as there are segment-columns on a disk in the array. One of the segment-columns of a segment contains the parity (exclusive-OR) of the remaining segment-columns of the segment. For performance reasons, the parity segment-columns are not all on the same disk, but are rotated among the disks.

Logical devices are mapped and stored in the LSA. A logical track is stored, as a set of compressed records, entirely within some segment-column of some physical disk of the array; many logical tracks can be stored in the same segment-column. The location of a logical track in an LSA changes over time. A directory, called the LSA directory, indicates the current location of each logical track. The entire LSA directory is maintained in Non-Volatile Storage (NVS) in the disk controller, to avoid disk accesses when searching the directory.

Whether an LSA stores information according to a variable length format such as a count-key-data (CKD) architecture or according to a fixed block architecture, the LSA storage format of segment-columns is mapped onto the physical storage space in the disk drive units so that a logical track of the LSA is stored entirely within a single segment-column mapped onto a disk drive unit of the array. The size of a logical track is such that many logical tracks can be stored in the same LSA segment-column.

Reading and writing into an LSA occurs under management of the LSA controller. An LSA controller can include resident microcode that emulates logical devices such as direct access storage device (DASD) disk drives, or tape drives. In this way, the physical nature of an external storage subsystem can be transparent to the operating system and to the applications executing on the computer processor accessing the LSA. Thus, read and write commands sent by the computer processor to the external information storage system would be interpreted by the LSA controller and mapped to the appropriate disk storage locations in a manner not known to the computer processor. This comprises a mapping of the LSA logical devices onto the actual disks of the LSA.

A write received from the host system is first written into a non-volatile cache and the host is immediately notified that the write is done. The fraction of cache occupied by modified tracks is monitored by the controller. When this fraction exceeds some threshold, some number of modified tracks are moved (logically) to a memory segment, from where they get written (destaged) to disk. The memory segment is a section of controller memory, logically organized as N+1 segment-columns called memory segment-columns; N data memory segment-columns and 1 parity memory segment-column. When all or part of a logical track is selected from the NVS, the entire logical track is written into one of the N data memory segment-columns. When all data memory segment-columns are full, an XOR operation is applied to all the data memory segment-columns to create the parity memory segment-column, then all N+1 memory segment-columns are written to an empty segment on the disk array.

All logical tracks that were just written to disk from the memory segment must have their entries in the LSA directory updated to reflect their new disk locations. If these logical tracks had been written before by the system, the LSA directory would have contained their previous physical disk locations; otherwise the LSA directory would have indicated that the logical track had never been written, so has no address. Note that writing to the disk is more efficient in LSA than in RAID-5, where 4 disk accesses are needed for an update.

In LSAs and log structured file systems, data to be written is grouped together into relatively large blocks (the segments) which are written out as a unit in a convenient free segment location on disk. When data is written, the previous disk locations of the data become free creating "holes" of unused data (or garbage) in the segments on disk. Eventually the disk fills up with segments and it is necessary to create free segment locations by reading source segments with holes and compacting their still-in-use content into a lesser number of destination segments without holes. This process is called free space or garbage collection.

To ensure that there is always an empty segment to write to, the controller free space collects segments in the background. All logical tracks from a segment selected for free space collection that are still in that segment (are still pointed to by the LSA directory) are read from disk and placed in a memory segment. It may be placed in the same memory segment used for destaging logical tracks written by the system, or it may be placed in a different memory segment or temporary storage buffer of its own. In any case, these logical tracks will be written back to disk when the memory segment fills. Free space collected segments are returned to the empty segment pool and are available when needed.

As free space collection proceeds, live data from the various target segments is read into the temporary storage buffer, the buffer fills up, and the live data is stored back into an empty segment of the disk array. After the live data in the temporary storage buffer is written back into the disk array, the segments from which the live data values were read are designated as being empty. In this way, live data is consolidated into a fewer number of completely full segments and new empty segments are created. Typically, free space collection is performed when the number of empty segments in the array drops below a predetermined threshold value.

The way in which target segments are selected for the free space collection process affects the efficiency of LSA operation. The LSA controller must determine how to collect segments when performing the free space collection. Three algorithms are used conventionally, one called the "greedy" algorithm, one called the "cost-benefit" algorithm and one called "age-threshold" algorithm. The greedy algorithm selects target segments by determining how much free space will be achieved for each segment processed and then processing segments in the order that will yield the most amount of free space. The cost-benefit algorithm compares a cost associated with processing each segment against a benefit and selects segments for processing based on the best comparisons. The age-threshold algorithm selects segments for processing only if their age in the information storage system exceeds an age-threshold value and once past the age-threshold, the segments are selected in the order of least utilised segments first.

More particularly, the greedy algorithm selects segments with the smallest utilization first and moves the live tracks from partially filled segments to a target segment in a pool of empty segments. There are two problems with greedy selection: first, segments which are emptying quickly (call "hot" segments) will get collected when it might be more beneficial to leave them a little longer until they contain less still-in-use data; secondly, segments which are nearly full and are emptying extremely slowly or not at all (called "frozen" segments) may tie up free space for a long time (or indefinitely) before they are collected when it might be beneficial to reclaim that free space earlier.

In the cost-benefit algorithm, a target segment is selected based on how much free space is available in the segment and how much time has elapsed since the segment was last filled with new information. The elapsed time is referred to as the age of the segment. In the cost-benefit algorithm, the age of a segment is defined to be the age of the youngest live track in the segment. For example, age might be indicated by a time stamp value associated with a track when it is placed in the LSA input write buffer. A benefit-to-cost ratio is calculated for each segment, such that the ratio is defined to be:

$$\frac{\text{Benefit}}{\text{Cost}} = \frac{(1-u)a}{(1+u)}$$

where u is called the utilization of the segment; (1−u) is defined to be the fraction amount of free space in the segment, also called the "dead" fraction; and a is the age of the segment as defined above. The cost-benefit algorithm orders segments by their benefit-to-cost ratio and selects as target segments those with the largest ratios. The numerator in the ratio represents the benefit to selecting the segment, being the product of the dead fraction (1−u) and the age a. The denominator (1+u) represents the cost of selecting the segment for free space collection, because the whole segment (all tracks) is read into the buffer and a fractional part u of the segment (the live tracks) is written back to direct access storage devices (DASDs).

A problem with the cost-benefit algorithm is the overhead associated with computing the benefit-to-cost ratios for each segment in the LSA and maintaining an ordering of the segments according to their benefit-to-cost ratios. The overhead quickly becomes prohibitive as the system is scaled upward in size. In particular, two segments can switch cost-benefit ratios, thereby switching their ordering for free space collection, simply with the passage of time and without regard to any change in actual utilization rate. In this way, a segment may have to be re-ordered even though its utilization has not changed. Note that the benefit (numerator above) is a function of age. Thus, a segment may be selected even though efficiency considerations might suggest that other segments with smaller utilization rates should be selected for free space collection first.

The age-threshold algorithm is described in U.S. Pat. No. 5,933,840 issued Aug. 3, 1999 and assigned to International Business Machines Corporation and the disclosure of this document is incorporated herein by reference. In the age-threshold system, segments are selected if their age exceeds a threshold value. The system determines the age of a segment by determining the amount of time a segment has been located in the storage system and considers a segment for free space collection only after the segment has been located in the storage system for the selected age threshold value. From the set of candidate segments, the system chooses one or more segments for free space collection in the order that they will yield the most free space. The free space yield is determined by utilisation data, so that the least utilised segments will be free space collected first. The age-threshold value depends on the configuration of the particular information storage system. The age-threshold value can be selected based on average segment utilisation information or by a dynamic learning method which selects the value based on the system workload and adjusts the value dynamically.

This age-threshold system of free space collection addresses the first problem of the greedy selection algorithm of quickly emptying segments or "hot" segments being collected when it might be beneficial to leave them a little longer. The age-threshold system does not address the problem of frozen segments. The age-threshold system has the disadvantage that it introduces a new problem of determining at run-time the correct value for an age-threshold parameter for a variable workload, thereby requiring run-time tuning.

From the discussion above, it should be apparent that there is room for an information storage system that efficiently manages information storage and performs free space collection, in particular which reclaims free space tied up in frozen segments and which is simple to implement for an unknown workload.

DISCLOSURE OF THE INVENTION

According to a first aspect of the present invention there is provided a method for performing free space collection in an information storage system having storage units in which information segments are located, the method comprising the steps of: determining a fitness value for at least some of the segments by determining the product of the amount of free space in the segment and the expected time the free space will last; choosing segments for free space collection with the maximum fitness values.

According to a second aspect of the present invention there is provided an information storage system comprising a storage controller and storage units in which information segments are located, the storage controller including: means for determining a fitness value for a number of segments by determining the product of the amount of free space in each segment and the expected time the free space will last; and means for choosing segments with the maximum fitness values, the chosen segments being used for free space collection.

According to a third aspect of the present invention there is provided an information storage system comprising a storage controller and storage units in which information segments are located, the storage controller performs a free space collection process by performing the steps of: determining a fitness value for at least some of the segments by determining the product of the amount of free space in the segment and the expected time the free space will last; choosing segments for free space collection with the maximum fitness values.

Most preferably, the information storage system is a log structured information storage system in which rewritten data is not rewritten in place and free space collection is carried out to compact segments with dead data in into full segments of live data and empty segments ready for writing.

The expected time the free space in a given segment will last may be estimated by the rate of use of still-in-use data in the segment.

A first order estimate of the product used to determine the fitness value is given by the equation:

$$\text{Fitness} = \text{Segment age} \times \frac{\text{Free } space^2}{\text{Used space}}$$

wherein segment age is the interval between a current time and a time at which the data in the segment was last written.

The segment age may be measured in one of real time, number of write transactions, number of segments written or destage sequence number and one of an average, maximum or minimum of the ages of the data in the segment can be used for each segment. The segment age may also include a write interval for the segment.

Preferably, a fitness value is determined for one of each of a group of sorted segments. The segments may be sorted by the amount of used data in each segment, each group of segments having a given range of amount of used data. All full segments may be sorted into one group and the remaining groups may have equal ranges of amounts of used data.

The segments may be listed within each group in a first-in first-out list and the fitness value is determined for the segment at the head of the list.

Alternatively, the segments may be sorted within each group by the time at which the data in the segment was last written or by a destage sequence number and the fitness value is determined for the segment with the greatest age in each group. In this arrangement the segments may be sorted by a tree data structure.

The main idea of the invention is to estimate the rate at which still-in-use data in a potential source segment is being written and to select segments based on maximising the product of the amount of free-space generated by collecting a segment and the expected time the free-space collected will last before rewrites of relocated still-in-use data claim the space back.

The invention collects space from segments containing only tracks which are never written and does not require a separate background process to do so. Also, no run-time parameters require tuning and therefore, choosing a configuration for an unknown workload is easy. The invention provides a free space collection algorithm with good system performance compared to the prior art algorithms.

BRIEF DESCRIPTION OF THE DRAWINGS

An embodiment of the present invention will now be described, by way of example only, with reference to the accompanying drawings in which.

DESCRIPTION OF THE PREFERRED EMBODIMENTS

Figure 1:
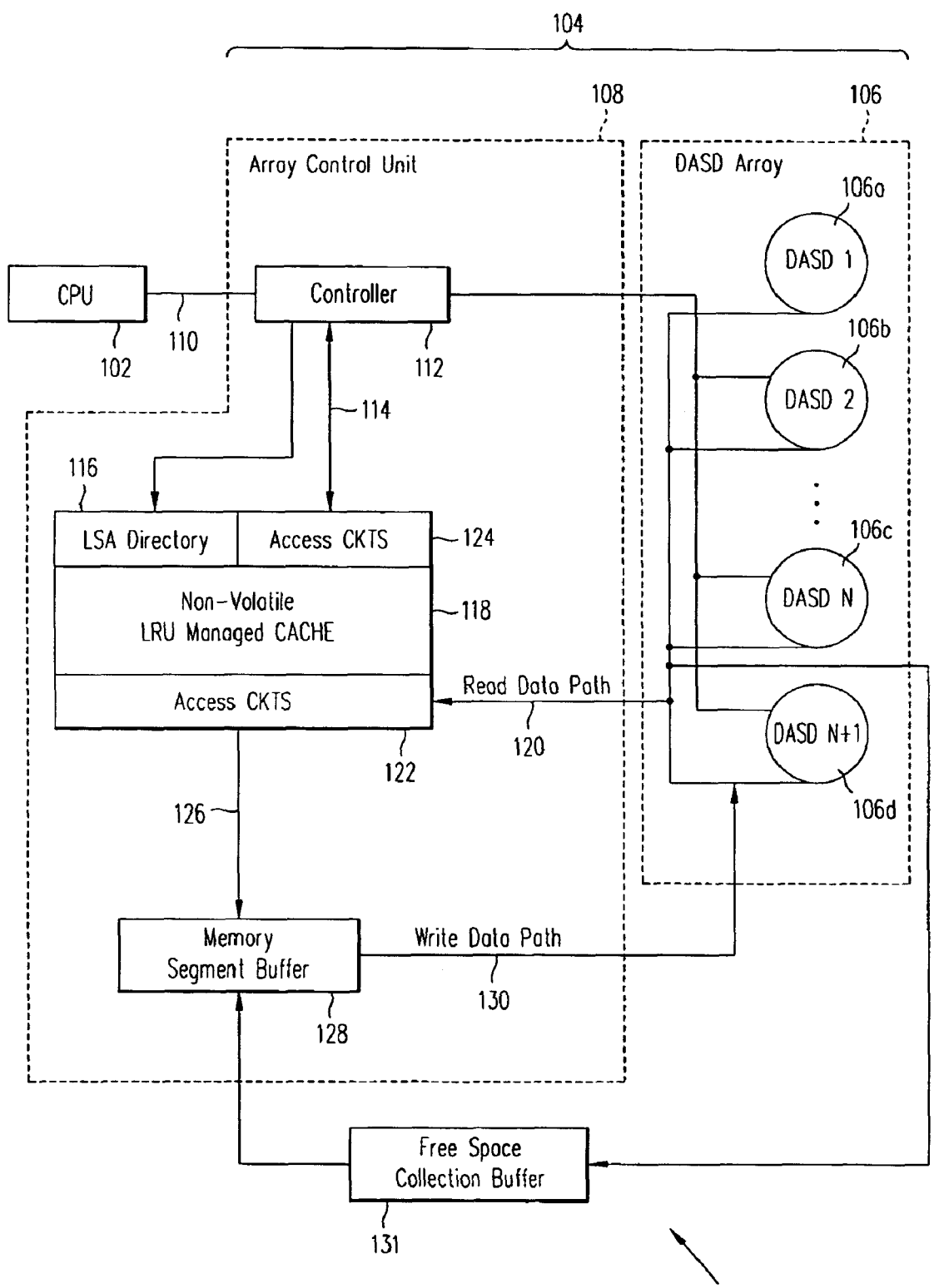
FIG. 1 is a representation of a computer system constructed in accordance with the present invention.

FIG. 1 shows a preferred embodiment of a computer system 100 constructed in accordance with the present invention. The system 100 includes a processor 102 or host computer that communicates with an external information storage system 104 having N+1 direct access storage devices (DASD) in which information is maintained as a log structured array (LSA). In FIG. 1, an array 106 comprising four DASDs 106a, 106b, 106c, and 106d is shown for illustration, but it should be understood that the DASD array may include a greater or lesser number of DASD. A control unit 108 controls the storage of information so that the DASD array 106 is maintained as an LSA. Thus, the DASD recording area is divided into multiple segment-column areas and all like segment-columns from all the DASDs comprise one segment's worth of data. The control unit 108 manages the transfer of data to and from the DASD array 106 so that periodically it considers segments for free space and selects target segments according to a fitness function described in detail below.

The processor 102 includes (not illustrated): one or more central processor units, such as a microprocessor, to execute programming instructions; random access memory (RAM) to contain application program instructions, system program instructions, and data; and an input/output controller to respond to read and write requests from executing applications. The processor 102 may be coupled to local DASD (not illustrated) in addition to being coupled to the LSA 104. Typically, an application program executing in the processor 102 may generate a request to read or write data, which causes the operating system of the processor to issue a read or write request, respectively, to the LSA control unit 108.

When the processor 102 issues a read or write request, the request is sent from the processor to the control unit 108 over a data bus 110 and is received in the control unit by a controller 112. In response, the controller produces control signals and provides them over a controller data path 114 to an LSA directory 116 and thereby determines where in the LSA the data is located, either in a non-volatile LSA data cache 118 or in the DASD 106. The LSA controller 112 comprises one or more microprocessors with sufficient RAM to store programming instructions for interpreting read and write requests and for managing the LSA 104 in accordance with the present invention.

Data is transferred between the processor 102 and the LSA 104 during read operations over a path including a read data path 120, DASD access circuits 122, the LSA data cache 118, controller access circuits 124, the controller data path 114, the controller 112, and the data bus 110. Data is transferred during write operations over a path including the data bus 110, the controller 112, the controller data path 114, the controller access circuits 124, the LSA data cache 118, the DASD access circuits 122, a segment data path 126, an accumulating memory segment input write buffer 128, and a DASD write path 130.

The data cache 118 permits delay of write operations on modified data tracks to the memory segment 128 for purposes of maintaining seek affinity. More particularly, if write operations to adjacent tracks are received, then all modified data in logically adjacent tracks will be moved into the memory segment 128 at the same time so they are stored in the same segment-column. This helps keep together tracks that are adjacent in the data cache so they will be adjacent when moved into the DASD array 106, thereby preserving seek affinity. The advantages and operation of the data cache 118 are described in greater detail in U.S. Pat. No. 5,551,003 issued Aug. 27, 1996 and assigned to International Business Machines Corporation.

Preferably, the LSA data cache 118 is managed as a least-recently-used cache, so that data is queued in the cache, with the most recently stored data at the top (or front) of the queue. In particular, the LSA data cache 118 is organized with clean data tracks in one LRU list and dirty tracks in another LRU list. The clean LRU list specifies tracks containing information wherein the data in the LSA cache is the same as the data in the DASD array, and the dirty LRU list specifies tracks containing modified data wherein data is different from the data in the DASD array.

A basic operation of the storage system 104 is to write a particular track so as to change the contents of the track. In general, such live data tracks are first placed in the non-volatile data cache memory 118 of the LSA control unit 108. When the fraction of the cache occupied by modified tracks exceeds a predetermined value, the controller 112 logically moves a set number of modified tracks to the memory segment 128 by assigning them there. After one segment's worth of live tracks are moved into the memory segment, the tracks are written into contiguous locations of the DASD array 106. It should be understood that the operation of the data cache 118 is transparent to the processor 102 and therefore some operations of the storage system 104 will be described from the perspective of the processor, without reference to the data cache. Although the inclusion of a data cache 118 as described above can improve the overall performance of an LSA system, it should be understood that the inclusion of a data cache and the details of its implementation are not essential to the invention.

The smallest unit of data that can be written by the processor 102 is called a track, and a predetermined number of tracks comprise a segment. At any time, a track is live, or current, in only one segment. In all other segments, the track is outdated, also referred to as being a dead track. From the perspective of the processor 102, a live data track is initially stored into controller memory (such as the data cache 118 or the input memory segment write buffer 128) comprising a segment so that initially is empty. That is, the segment so resides in the controller memory as the segment is filled.

If a track k is being written into the segment $s_o$ of controller memory and if the track k was previously live in some other DASD segment s in the DASD 106 before the write operation, then the track k becomes dead in the segment s and becomes live in the controller segment $s_o$ being filled. This continues until the segment $s_o$ in the LSA controller memory is filled to capacity, at which time the segment $s_o$ is destaged, meaning that it is moved from the memory segment buffer 128 and written to the DASD array 106. Another segment's worth of data is then filled in the controller memory and the process repeats until the next destage operation.

As data writing proceeds from LSA data cache memory to DASD in this manner, the DASD storage in the LSA becomes fragmented. That is, after several sequences of destaging operations, there can be many DASD segments that are only partially filled with live tracks and otherwise include dead tracks. This affects an LSA operating statistic referred to as utilization.

At any time, the utilization of a segment is the fraction of the segment containing live tracks. Thus, if a segment contains L live tracks and if the segment capacity is C tracks, then the utilization of the segment is given by:

$$\text{Utilization} = L/C \tag{1}$$

The writing process described immediately above will eventually deplete the empty segments in the DASD array 106. Therefore, a free space collection process (described further below) is performed to create empty segments. Free space collection is carried out by choosing a certain number of partially-filled target segments in DASD and compacting the live tracks in these segments into a fewer number of full segments, thereby creating empty segments. For example, if free space collection is performed on three partially empty segments, and each has a 2/3 utilization rate, then the live tracks can be collected and reorganized into two full segments and one completely empty segment that is ready to receive data from the LSA input write buffer 128. Thus, a net increase of one empty segment is created by the free space collection process.

In the preferred embodiment, the target segments are collected in a free space collection buffer 131 for compaction into the segment buffer 128. Alternatively, the free space collected segments can be compacted directly into the segment buffer. The segment buffer 128 contains at least two physical buffers, each of which can hold one segment of data. One physical buffer collects newly written live tracks that are received over the data path 126. Another separate physical buffer collects live tracks that were taken from free space collected segments for the purpose of compaction, for example, these tracks are received from the free space collection buffer 131. When one of these buffers is filled to capacity, the contents of the buffer are written to an empty segment in the DASD array. Thus, in the preferred embodiment, newly-written tracks are placed into segments separate from segments used for free space collected tracks. The free space collection process is typically a low priority, background process carried our periodically by the controller 112.

As noted above, the LSA control unit 108 of the preferred embodiment includes both a non-volatile LSA data cache 118 and a memory segment buffer 128. The memory segment buffer contains sufficient data storage to contain at least two segments of data, but preferably contains sufficient storage to contain several segments of data. The LSA data cache 118 stores both updated logical tracks of data received from the processor 102 and clean logical tracks read from the DASD array 106.

The controller 112 includes microcode that emulates one or more logical devices so that the physical nature of the external storage system (the DASD array 106) is transparent to the processor 102. Thus, read and write requests sent from the processor 102 to the storage system 104 are interpreted and carried out in a manner that is otherwise not apparent to the processor. In this way, one or more logical (virtual) devices are mapped onto the actual DASDs of the array 106 by the array control unit 108.

Because the controller 112 maintains the stored data as an LSA, one or more logical tracks can be stored entirely within a segment-column of one of the DASDS 106a, 106b, 106c, 106d. Over time, the location of a logical track in the DASD array can change. The LSA directory 116 has an entry for each logical track, to indicate the current DASD location of each logical track. Each LSA directory entry for a logical track includes the logical track number, the actual DASD drive number and segment-column number within the DASD, the starting sector within the column at which the logical track starts, and the length of the logical track in sectors.

When the controller 112 receives a read request for data in a logical track, it determines the logical track in which the data is stored, examines the LSA directory 116, and determines the DASD number, starting sector, and length in sectors to which the logical track is currently mapped. The controller then reads the relevant sectors from the corresponding DASD unit of the N+1 units in the array 106.

When it receives a write request, the controller 112 first accumulates the data to be written in the memory segment buffer 128, which can store N+1 segment-columns to form one complete segment. Each segment comprises N segment-columns of data (user information) and one segment-column of parity data. When the memory segment is full, a parity segment-column is generated by performing an exclusive-OR operation over all of the N data segment-columns in the segment. Next, the N+1 segment-columns are written to an empty segment in the DASD array 106, and the LSA directory entries for all logical tracks that were written to DASD from the memory segment are updated to reflect the new DASD locations.

Because of the updating and deletion of logical tracks, gaps in the DASD segments occur. Therefore, to ensure that an empty segment is always available in the DASD array 106, the array control unit 108 periodically performs the free space collection process on segments in the LSA. In the free space collection process generally, a subset of the DASD array segments is selected for free space collection and DASD tracks in the segments are read and moved into the part of the memory segment buffer used to collect live tracks from the free space collection process. These "live" logical tracks are rewritten back to DASD when the buffer is full. As a result, space is freed on the DASDs. The freed space is returned to a pool of empty segments that are available for data storage.

Figure 2:
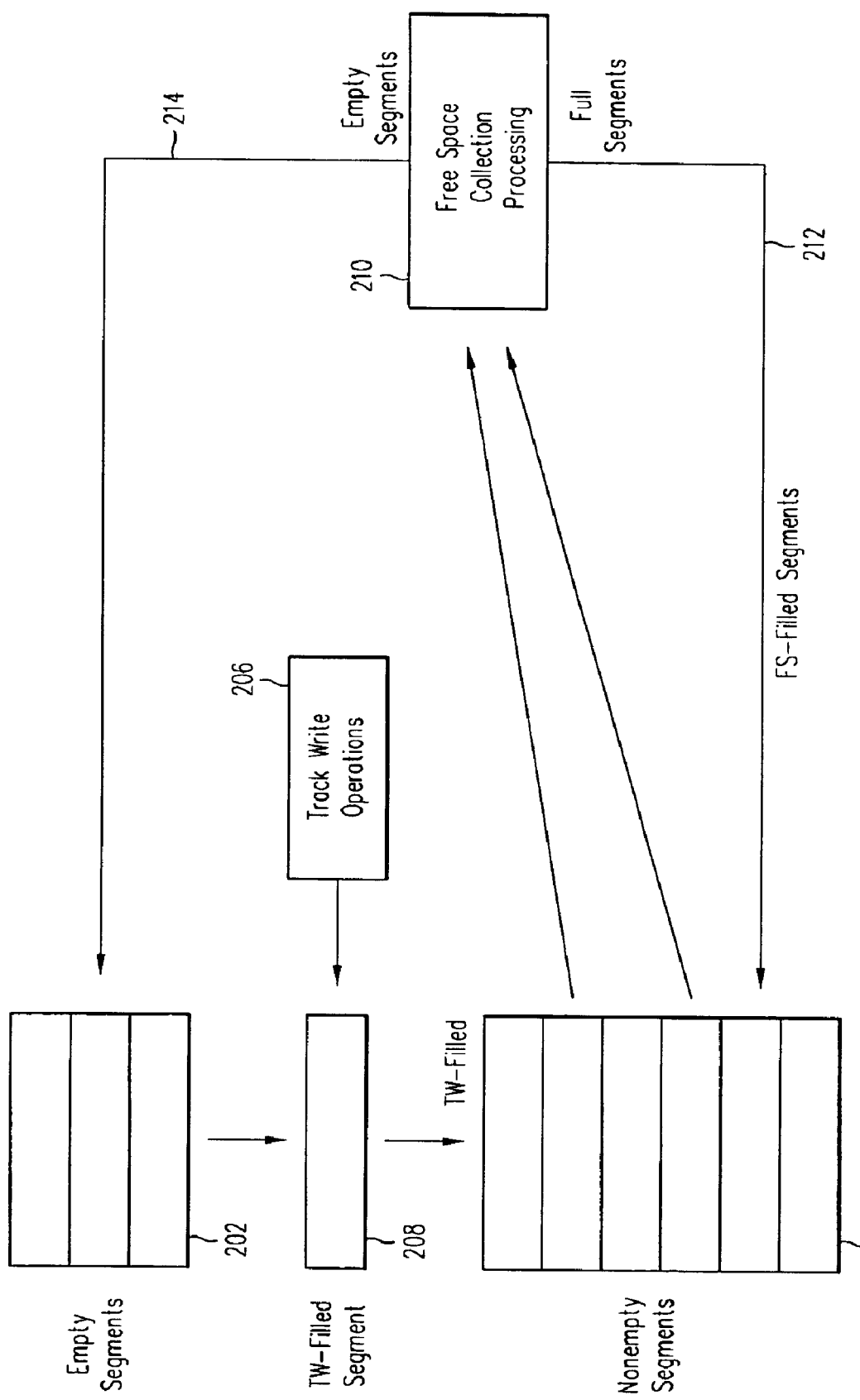
FIG. 2 is a block diagram representation of the free space collection process performed by the computer system illustrated in FIG. 1.

The storage area in the LSA 104 can be considered as a collection of segments whose configuration changes from filled to empty and back again. FIG. 2 illustrates this configuration. The storage area in the DASD array 106 is organised into segments. These segments may be completely empty (as represented in FIG. 2 as a pool or queue of empty segments 202) or may contain a mixture of live data and dead data tracks (represented in FIG. 2 as the pool of non-empty segments 204). Track write operations are used to completely fill one segment's worth of data in the memory segment buffer, whose contents are then transferred to the next available empty DASD segment. This processing is represented in FIG. 2 by an empty DASD segment receiving one segment's worth of track write operations 206 to become a track-write-filled (TW-filled) segment 208. The TW-filled segment thereby joins the ranks of the non-empty segments. Free space collection processing 210 therefore is understood as collecting partially-filled, non-empty segments 204 and creating both completely filled segments as designated by the free space filled (FS-filled) segments path 212 and segments completely emptied as designated by the empty segments path 214.

Given increasing demand for continuous 24×7 operation and the fact that free space collection efficiency will decrease as the number of segments collected per invocation increases it is likely that the best way to perform free space collection is as a continuous background process which maintains just enough empty segments to cover bursts in the track write workload.

The object of free space collecting a segment is to acquire some free space. In time, the free space acquired is taken away again by track writes which result in further holes in other segments. When a segment is free space collected, it contributes its empty space to the pool of free space available for track writes and it contributes its still-valid tracks to the stream of tracks which must be written into new segments which will eventually take back the contributed free space.

The fitness of a segment for free space collection is calculated in accordance with the present invention by taking the product of the amount of free space contributed by the segment and the expected time the free space will last based on the rate of consumption of free space by still-valid tracks contributed by the segment. An estimate of this product is derived resulting in a fitness function that can be determined for a segment. The higher the fitness function the better a segment is for free space collection. Other estimates of the product can be obtained to evaluate fitness of segments and the fitness function described below is a first-order estimate of the product.

If the amount of free space contributed by a segment is called Free, the amount of used space in a segment on collection is called Used and the number of segment writes since the tracks in the segment were originally written is called Age then the function used to determine the segment fitness for selection for free space collection (Fitness) is given by the equation:

$$\text{Fitness} = \text{Free} \times \text{Time} \quad (2)$$

Where Time is the expected time the free space contributed by a segment will last and is given by the equation:

$$\text{Time} = \frac{\text{Free}}{\text{Rate}} \quad (3)$$

and the best estimate for Rate, given only Used and Age, is:

$$\text{Rate } \mu \frac{\text{Used}}{\text{Age}} \quad (4)$$

Rate is estimated by using the information that tracks remaining in the segment when it is free space collected were written at the beginning of the period Age and have not been rewritten since. Each track remaining in the segment is written at a rate proportional to 1/Age and the numerator Used scales this according to the number of tracks remaining. Age is the interval measured in real time or in number of write transactions or number of segments written between the current "time" and the "time" at which the data in the segment was last written (as opposed to when it was last relocated due to free space collection).

If the previous write interval (Interval) was stored for the segment as well as the destage sequence number then it would again be possible to make a more accurate estimate using:

$$\text{Rate } \mu \frac{\text{Used}}{\text{Age} + \text{Interval}} \quad (5)$$

In this embodiment, the previous write interval is not stored and Equation (4) is used. Substituting Equation (4) into Equation (3) and the results into Equation (2) obtains what is referred to as the fitness function:

$$\text{Fitness} = \frac{\text{Age} \times \text{Free}^2}{\text{Used}} \quad (6)$$

Or written another way:

$$\text{Fitness} = \frac{\text{Age} \times (\text{No. of tracks} - \text{Used})^2}{\text{Used}}$$

If Used and Free are measured in fractions of a segment then the fitness function can be used to compare different sized segments in log structured arrays which support multiple segment sizes.

If Used and Free are measured in Segments and Age is measured in segment writes which can be interpreted as a units of Time then the dimensions of the fitness function are Segments×Time.

When data is written it is collected into a segment and that segment is written out at a particular time so the time the data in a first-generation segment was written is the same for all of the data in that segment. When segments are free space collected, data from multiple segments is relocated into fewer segments and data which was written at different times may be grouped into the same segment. It would be possible, but inefficient, to keep with each unit of data (across free space collection) the time at which it was originally written and calculate an average value for Age for use in the fitness function by averaging the individual write times.

A more efficient approximation for determining a value to use for Age is simply to keep track of an average (or alternatively a maximum or minimum) write time for data contributing to a destination free space collection segment and to record this single value for the segment. The Age value can then be determined by using this average write time.

The fitness function should satisfy the following obvious conditions:
1. Completely full segments should all have the same fitness independent of their age.
2. The fitness of full segments should be the lowest fitness value.
3. Completely empty segments should all have the same fitness independent of their age.
4. The fitness of empty segments should be the highest possible fitness.
5. The fitness of segments at a given utilisation (other than full or empty) should increase with age.

Figure 3:
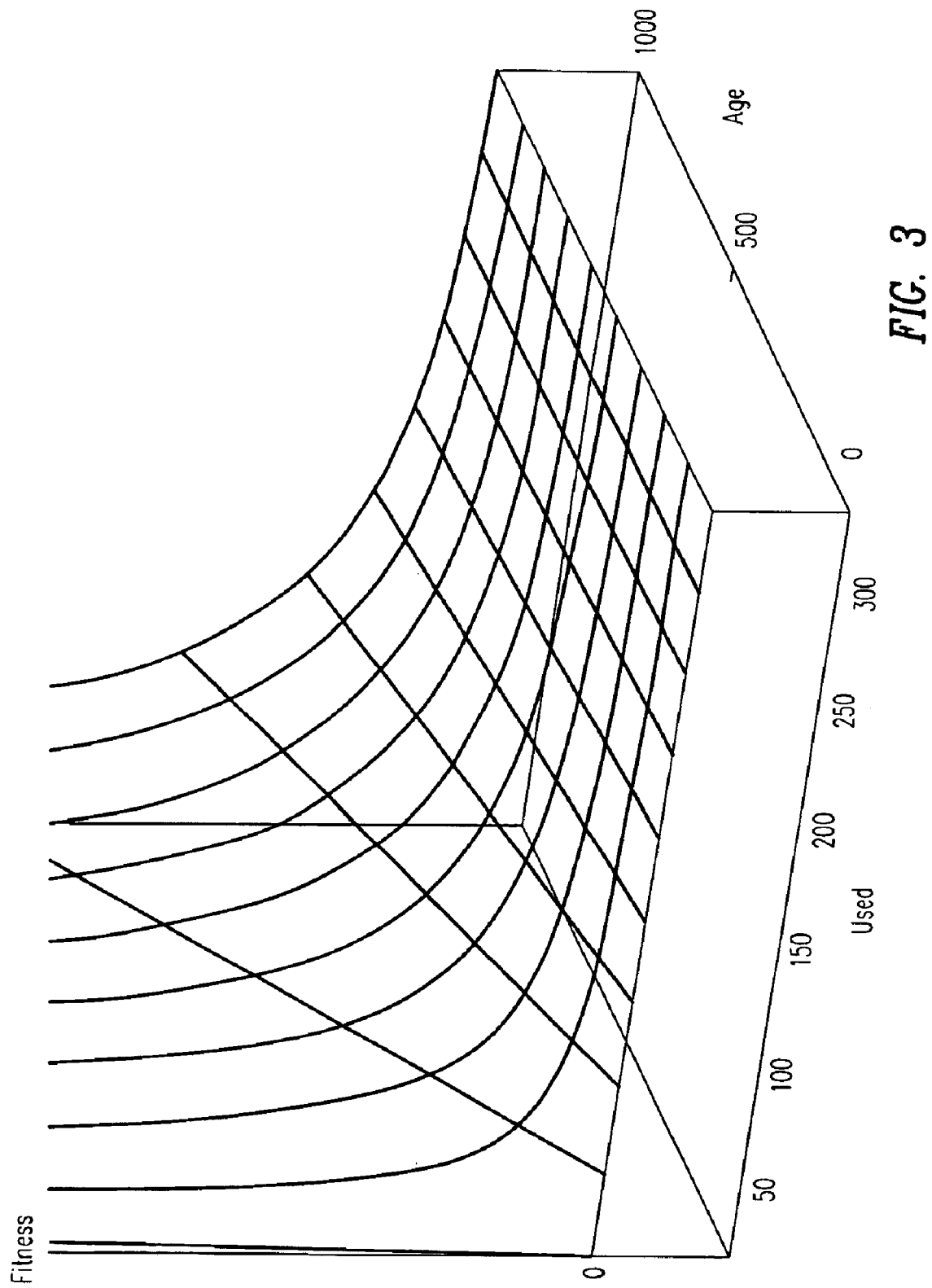
FIG. 3 is a plot of segment fitness for free space collection in accordance with the present invention, in this example a segment may contain up to 300 fixed-sized tracks.

FIG. 3 shows a plot of Equation (6) for segments which can contain a maximum of 300 fixed sized tracks. The plot shows:

$$\frac{\text{Age} \times (300 - \text{Used}) \times (300 - \text{Used})}{\text{Used}}$$

It can be noted that in FIG. 3, the fitness function of Equation (6) satisfies all the above conditions:
1. Completely full segments all have zero fitness.
2. Zero is the lowest fitness value.
3. Completely empty segments all have infinite fitness.
4. Infinity is the highest possible fitness. (It is not actually necessary to deal with infinite fitnesses because segments which are empty are put on a free list which is emptied before free space collection is invoked.)
5. The fitness of segments at a given utilisation (other than full or empty) increases with age.

Figure 4:
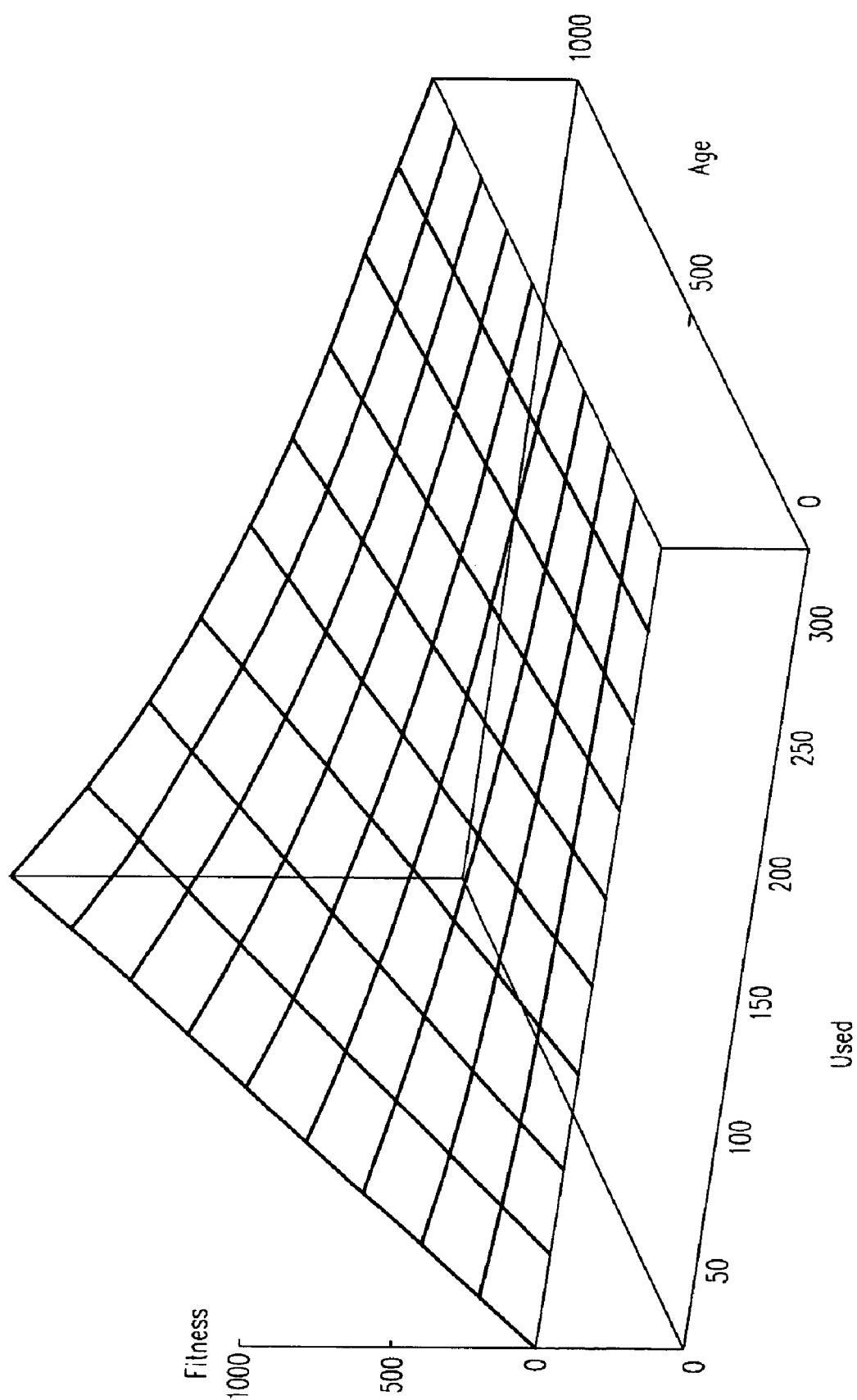
FIG. 4 is a plot of segment cost-benefit for free space collection as known from the prior art, in this example a segment may contain up to 300 fixed-sized tracks.

It is interesting to contrast the plot of FIG. 3 with the plot of FIG. 4 which shows the corresponding plot of the cost-benefit selection criterion of the prior art. The cost-benefit selection system does not satisfy conditions 3 or 4 given above. With the cost-benefit selection system, if empty segments were not treated as a special case, it would be possible for a segment with valid tracks to be selected in preference to a completely empty segment.

It is possible but inefficient to evaluate the fitness function for every available source segment. It is undesirable to sort the segments by fitness before selecting segments because that would not scale well to practical sized arrays. It is also undesirable to keep segments sorted by fitness because the relative positions of segments would change as they aged.

Some form of sorting is therefore needed and the fitness function only applied to just one segment for each sorted group. One method of sorting is to group segments into "buckets" where each bucket covers a range of utilisation or Used values. If there are b buckets, then the i-th bucket (1£ i£ b) contains segments whose utilisation (or Used) lies in the range (i−1)/b<u£ i/b. The number of buckets can be chosen to suit a particular storage system, for example 16 buckets could be used, one bucket containing segments whose utilisations are between 0 and $\frac{1}{16}$, a second bucket for segments whose utilisations are greater than $\frac{1}{16}$ but less than or equal to $\frac{1}{8}$, the next bucket will be for utilisations greater than $\frac{1}{8}$ but less than or equal to $\frac{3}{16}$, and so forth.

It is beneficial to ensure that the bucket containing segments with the highest utilisation contains only segments which are completely full. This avoids the selection of a full segment in preference to a non-full segment. The rest of the buckets may be uniformly distributed over the range of possible segment utilisations. The segments are kept bucket sorted such that segments may change from one bucket to another as their utilisation changes. Changing between ranges of utilisation (between buckets) requires less operating overhead than keeping the segments in a list by utilisation wherein a segment must change position in the list every time its utilisation changes.

The fitnesses of the segments tested, one for each of the different buckets, are then compared and the segment with the highest fitness is selected. When choosing a segment to test from a particular bucket it would be desirable to choose the most fit segment in the bucket but this would require the buckets to be sorted by fitness which would be too inefficient because all the fitnesses would change with time and the buckets would require constant reordering. Instead, it is possible to efficiently choose a segment from among the most fit segments in a bucket by keeping segments in a bucket in a FIFO list or by keeping the segments in a bucket sorted by the time they were last written or by destage sequence number.

The list in each bucket can be a first-in, first-out (FIFO) data structure or queue. Each FIFO list has a "tail" where segments (or actually segment names) enter and a "head" where segments are removed. With this form of sorting within each bucket, only the segment at the head of each non-empty FIFO list has the fitness function calculated for it.

As an alternative to the FIFO data structure, within each bucket the segments can be sorted (and are kept being sorted) by the time at which the data in the segment was last written or by destage sequence number. The segments are sorted in a form of tree data structure. The fitness function is calculated for the segment in each non-empty bucket with the greatest age. Sorting segments in a bucket by destage number involves additional cost overheads. An array controller RAM is required to store destage sequence numbers for each segment and additional overhead is required to keep the segments sorted by destage sequence number. However, these additional costs and overhead are acceptable if the fitness function results in better array I/O throughput than the algorithms of the prior art.

If the buckets are not used and the segments are kept sorted by utilisation and segments with a given utilisation are kept sorted by destage sequence number, it is possible to select the best segment in $0(\log(N^o \text{ Segments}))$ time. This is done by evaluating the fitness of the oldest segment with a given utilisation for all possible utilisations and selecting the most fit out of those. Calculating the fitnesses takes 0(1) time but inserting or removing a segment from the sorted data structure takes $0(\log(N^o \text{ Segments}))$ time when a tree insertion sort is used.

Since there are many possible destage utilisations in an implementation (the segment could contain a large number of tracks and in the target product the tracks will be compressed so utilisation will be measured in fractions of tracks) the constant factor in the time taken may be considered unacceptable due to the large number of segments which needed to be evaluated. This factor is proportional to the number of possible segment utilisations which is constant for any particular implementation. Perfect segment selection therefore needs to be approximated by dividing the possible utilisation range into the buckets described above and sorting all of the segments in a given bucket together. In the limit, when the number of divisions of the utilisation range is equal to the number of possible utilisation values the approximation reverts to the is unapproximated algorithm.

Free space collection proceeds whenever the value of a free space collection flag is set to "on". The process that sets the flag is external to the invention. For example, the process might set flag to "on" when the number of empty segments falls below a certain threshold, and set flag to "off" when the number of empty segments reaches another (larger) threshold.

Figure 5:
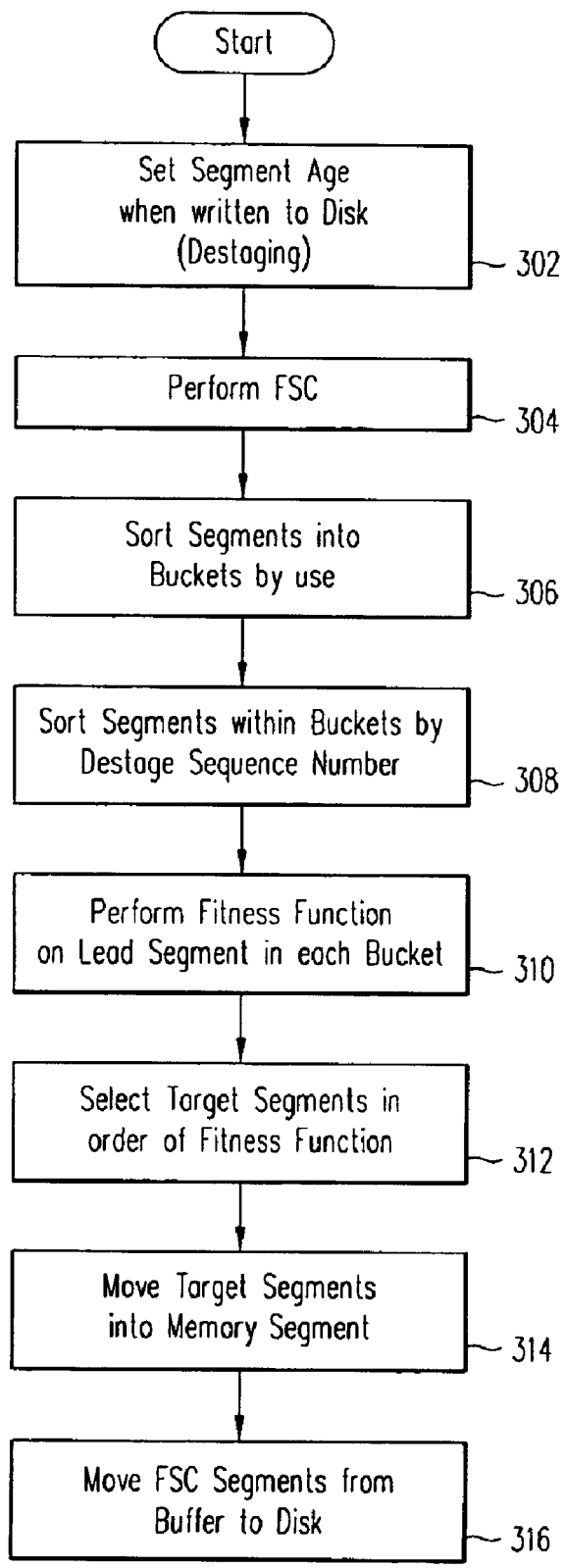
FIG. 5 is a flow diagram representation of the free space collection operations in accordance with the present invention performed by the computer system illustrated in FIG. 1.

FIG. 5 is a flow diagram that illustrates the processing steps performed by the LSA controller 112 in managing the LSA 104.

The flow diagram box numbered 302 indicates that LSA operations begin with the setting of segment age when a segment is written from the LSA memory segment buffer 128 to the DASD array 106. Next, the free space collection (FSC) process is initiated at the flow diagram box numbered 304. Those skilled in the art will appreciate that different methods exist for determining when free space collection should be performed, such as the percentage of empty segments in the LSA. These methods do not form a part of this invention. The utilisation of each segment is determined and the segments are sorted into buckets according to the range in which their utilisation lies which is represented by the flow diagram box numbered 306. The segments are sorted within each bucket, in this example by destage sequence number as represented by the flow diagram box numbered 308, alternatively segments may be sorted in each bucket by means of a FIFO queue.

After all candidate segments are sorted, the LSA controller 112 selects the lead segment in each bucket and determines the fitness function for that segment as represented in box 310. Target segments are then selected in order of the highest fitness function first as represented in box 312. The next step of the free space collection process is represented by the flow diagram box numbered 314, which shows that the LSA controller 112 moves segments into the segment buffer for compaction. Lastly, shown by the box numbered 314, the LSA controller 112 moves the free space filled segments from the memory segment buffer 128 to the DASD array. It should be understood that the flow diagram in FIG. 3 is shown as a sequential process for illustration, and that the functions performed by different boxes might be performed concurrently.

The method of free space collection described herein using the fitness function algorithm achieves good free space collection efficiency by approximately selecting segments which yield the maximum product of free space generated and time that the free space will last. The free space collection described reclaims free space tied up in frozen segments because the estimate of the write rate for these segments used in the fitness function algorithm decreases as time passes until they become the most fit segments for selection. Also this method does not have any run-time parameters which need calculating and altering during the free space collection process and is therefore simple to implement for an unknown workload or utilisation of the segments.

Modifications and improvements can be made to the foregoing without departing from the scope of the present invention.

What is claimed is:

1. A method for performing free space collection in an information storage system having storage units in which information segments are located, the method comprising the steps of:

determining a fitness value for at least some of the segments by determining the product of the amount of free space in the segment and the expected time the free space will last, the fitness value determined by the equation:

$$\text{Fitness} = \text{Segment age} \times \frac{\text{Free space}^2}{\text{Used space}},$$

wherein segment age is the interval between a current time and a time at which the data in the segment was last written, the segment age measured in one of real time, number of write transactions, number of segments written or destage sequence number, the segment age comprising one of a write interval for the segment, an average, maximum or minimum of the ages of the data in the segment; and choosing segments for free space collection with the maximum fitness values.

2. A method as claimed in claim 1, wherein the expected time the free space in a given segment will last is estimated by the rate of use of still-in-use data in the segment.

3. A method as claimed in claim 1, wherein a fitness value is determined for one of each of a group of sorted segments.

4. A method as claimed in claim 3, wherein the segments are sorted by the amount of used data in each segment, each group of segments having a given range of amount of used data.

5. A method as claimed in claim 4, wherein all full segments are sorted into one group and the remaining groups have equal ranges of amounts of used data.

6. A method as claimed in claim 3, wherein the segments are listed within each group in a first-in first-out list and the fitness value is determined for the segment at the head of the list.

7. A method as claimed in claim 3, wherein the segments are sorted within each group by the time at which the data in the segment was last written or by a destage sequence number and the fitness value is determined for the segment with the greatest age in each group.

8. A method as claimed in claim 7, wherein the segments are sorted by a tree data structure.

9. A method as claimed in claim 1, wherein the method is used in a log structured information storage system.

10. An information storage system comprising:

a storage controller; and storage units in which information segments are located; the storage controller including:

means for determining a fitness value for a number of segments by determining the product of the amount of free space in each segment and the expected time the free space will last, the fitness value determined by the equation:

$$\text{Fitness} = \text{Segment age} \times \frac{\text{Free space}^2}{\text{Used space}},$$

wherein segment age is the interval between a current time and a time at which the data in the segment was last written, the segment age measured in one of real time, number of write transactions, number of segments written, or destage sequence number, the segment age comprising one of a write interval for the segment, an average, maximum or minimum of the ages of the data in the segment; and means for choosing segments with the maximum fitness values, the chosen segments being used for free space collection.

11. An information storage system as claimed in claim 10, wherein a means for determining the expected time the free space in a given segment will last is estimated by the rate of use of still-in-use data in the segment.

12. An information storage system as claimed in claim 10, wherein the segments are sorted into groups and the means for determining a fitness value is applied to one segment from each group.

13. An information storage system as claimed in claim 12, wherein the segments are sorted by the amount of used data in each segment, each group of segments having a given range of amount of used data.

14. An information storage system as claimed in claim 13, wherein all full segments are sorted into one group and the remaining groups have equal ranges of amounts of used data.

15. An information storage system as claimed in claim 12, wherein a first-in first-out list is provided within each group to list the segments and the fitness value is determined for the segment at the head of the list.

16. An information storage system as claimed in claim 12, wherein the segments are sorted within each group by the time at which the data in the segment was last written or by a destage sequence number.

17. An information storage system as claimed in claim 16, wherein a tree data structure is provided for sorting the segments.

18. An information storage system as claimed in claim 10, wherein the information storage system is a log structured storage system.

19. An information storage system as claimed in claim 10, wherein the storage system is a log structured file system.

20. An information storage system as claimed in claim 10, wherein the information storage system is an external storage system and is a log structured array.

21. An information storage system comprising:

a storage controller; and storage units in which information segments are located, the storage controller performs a free space collection process by performing the steps of:

determining a fitness value for at least some of the segments by determining the product of the amount of free space in the segment and the expected time the free space will last, the fitness value determined by the equation:

$$\text{Fitness} = \text{Segment age} \times \frac{\text{Free space}^2}{\text{Used space}},$$

wherein segment age is the interval between a current time and a time at which the data in the segment was last written, the segment age measured in one of real time, number of write transactions, number of segments written, or destage sequence number, the segment age comprising one of a write interval for the segment, an average, maximum or minimum of the ages of the data in the segment; and choosing segments for free space collection with the maximum fitness values.

\* \* \* \* \*